Figure 1:
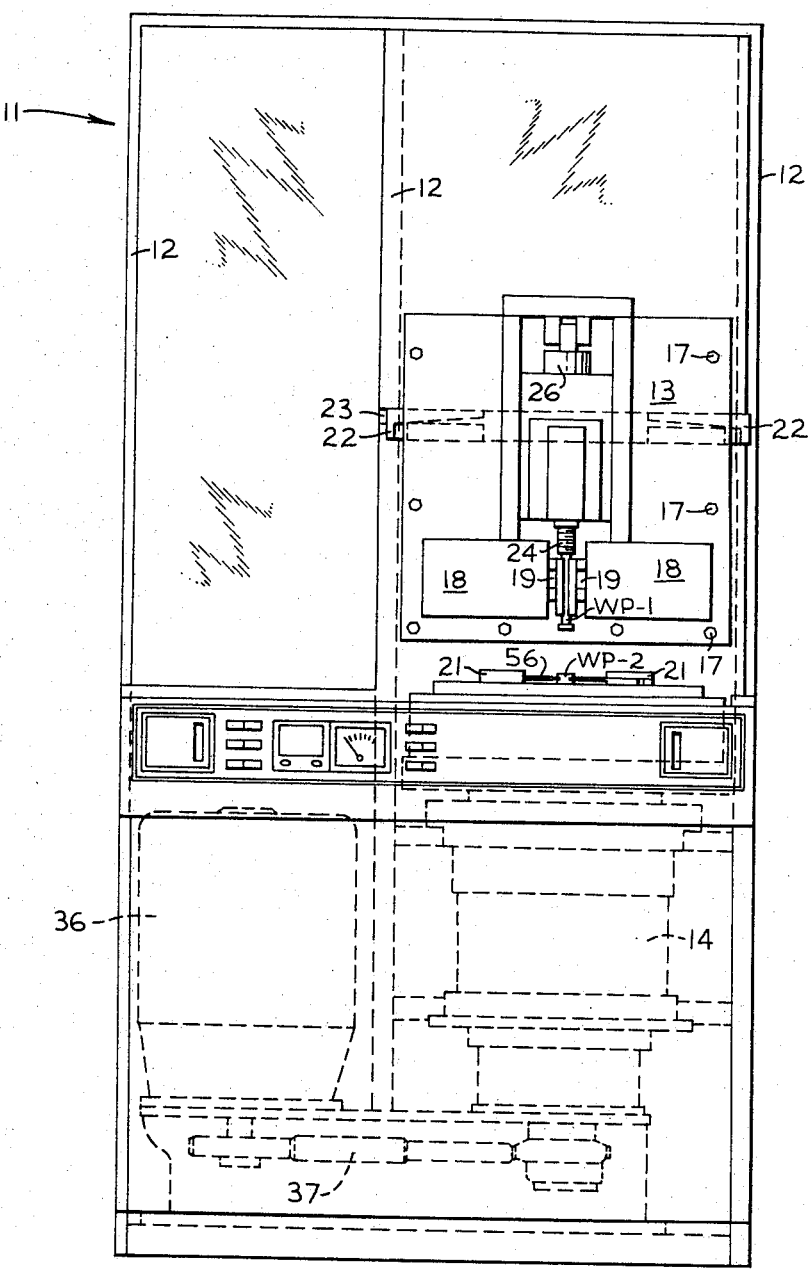

Oct. 31, 1967

C. E. LIPP ETAL 3,349,982

FRICTION WELDING MACHINE WITH STORAGE
MEANS FOR INERTIAL MASSES

Filed April 22, 1965

5 Sheets-Sheet 1

Fig-1-

INVENTORS
CHARLES E. LIPP
EUGENE R. MARTIN
IRA H. SAGE
GEORGE W. VICARY

ATTORNEYS

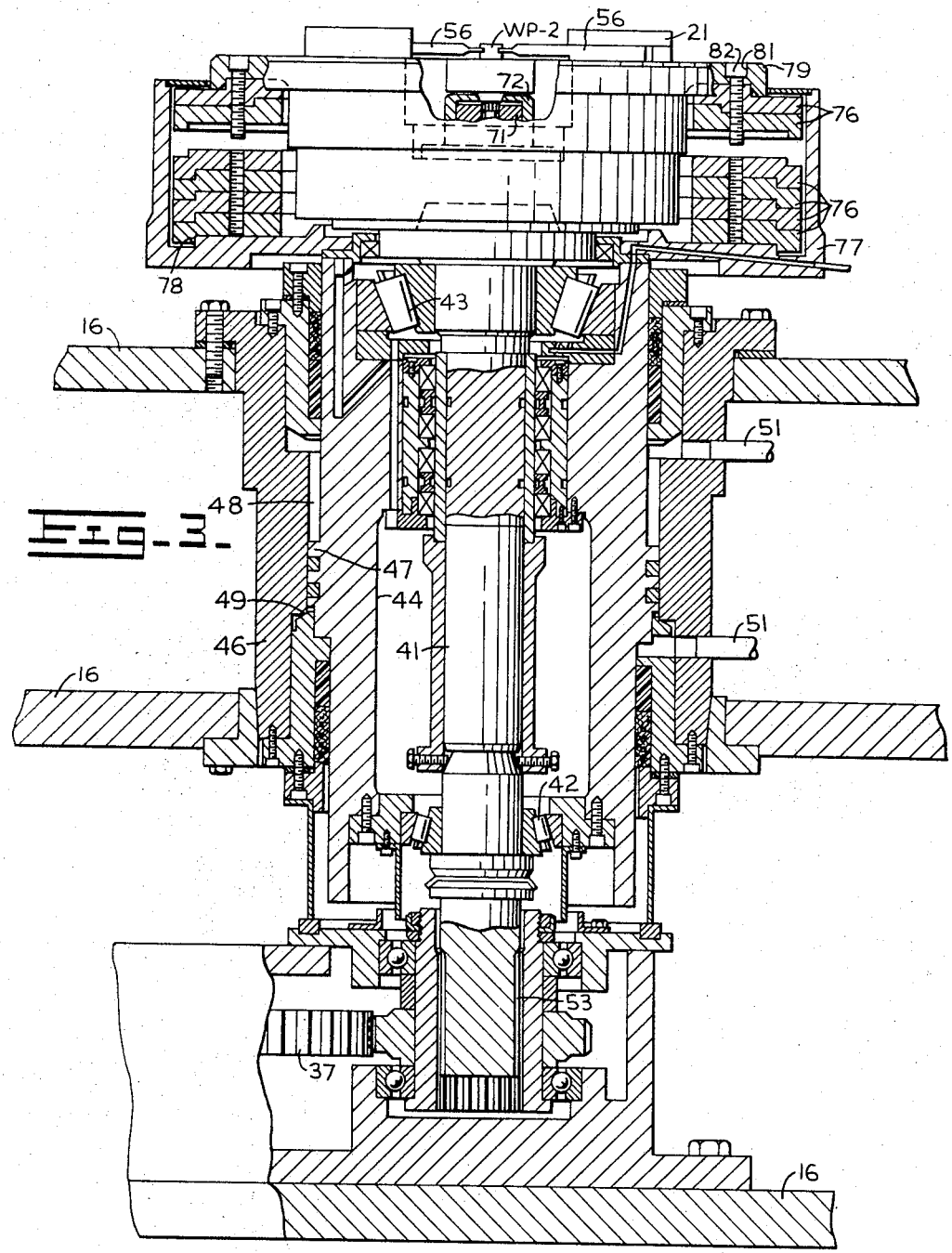

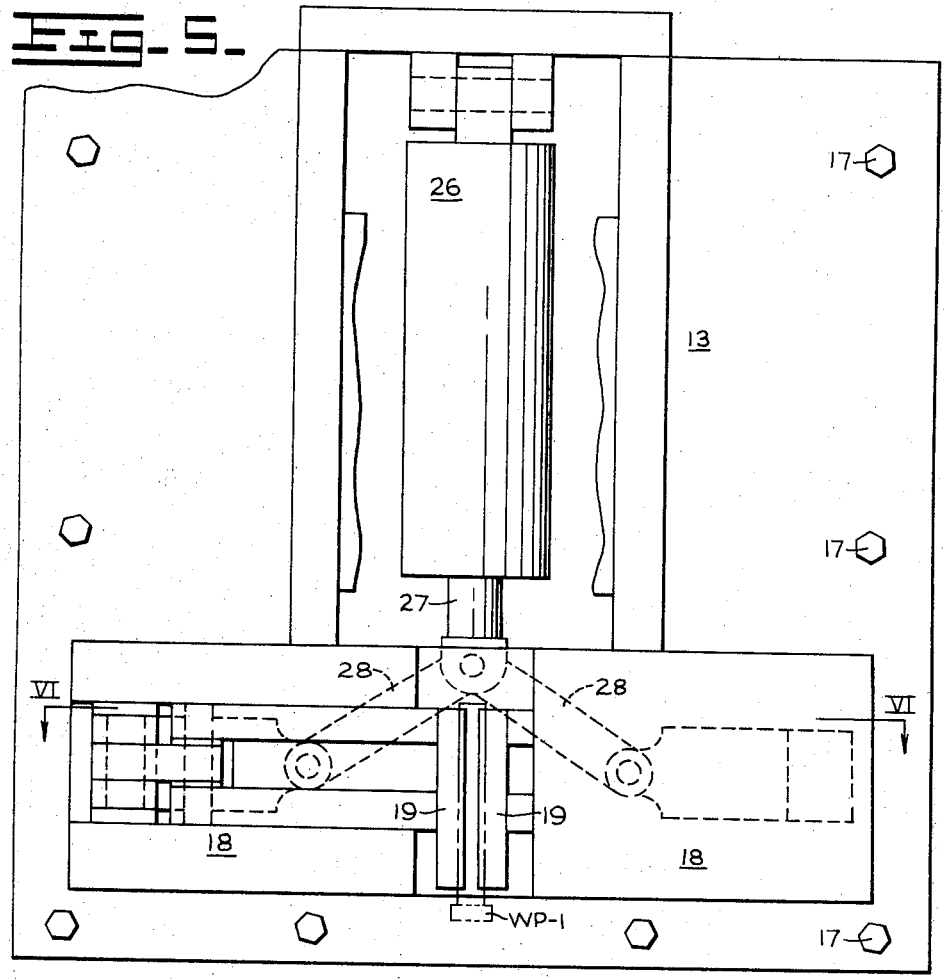
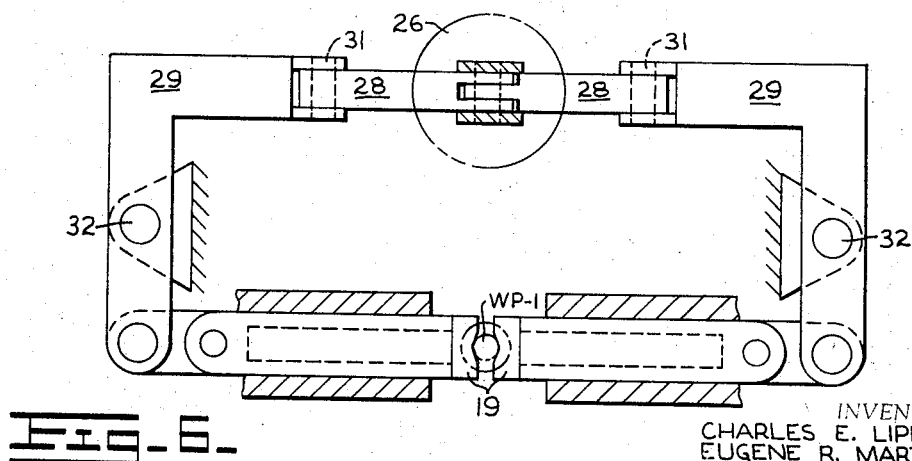

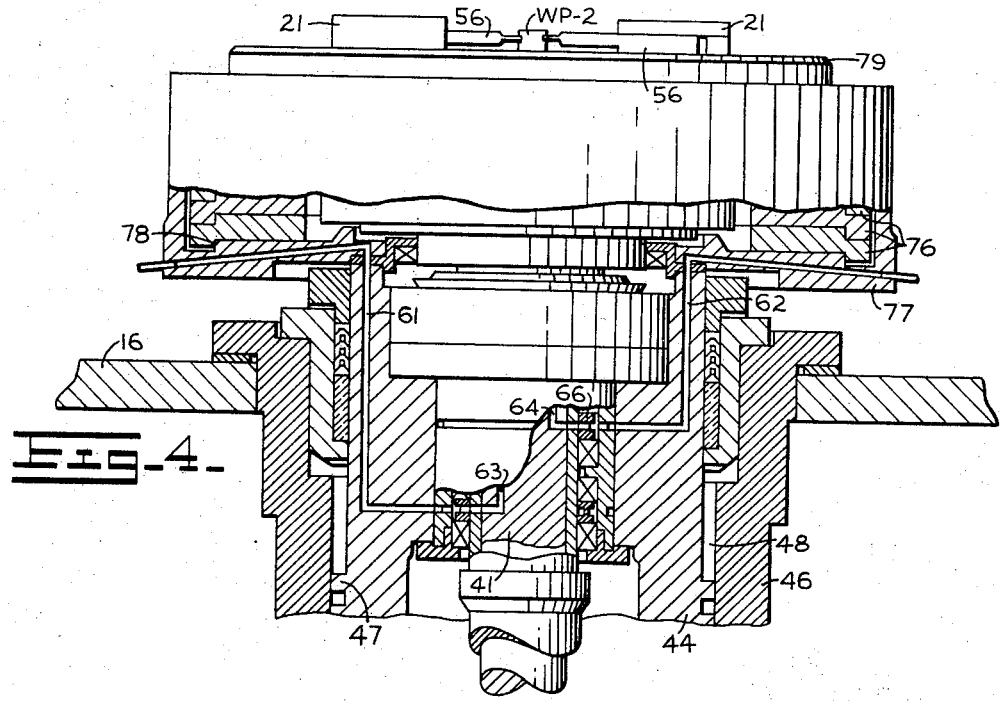
Fig-4-
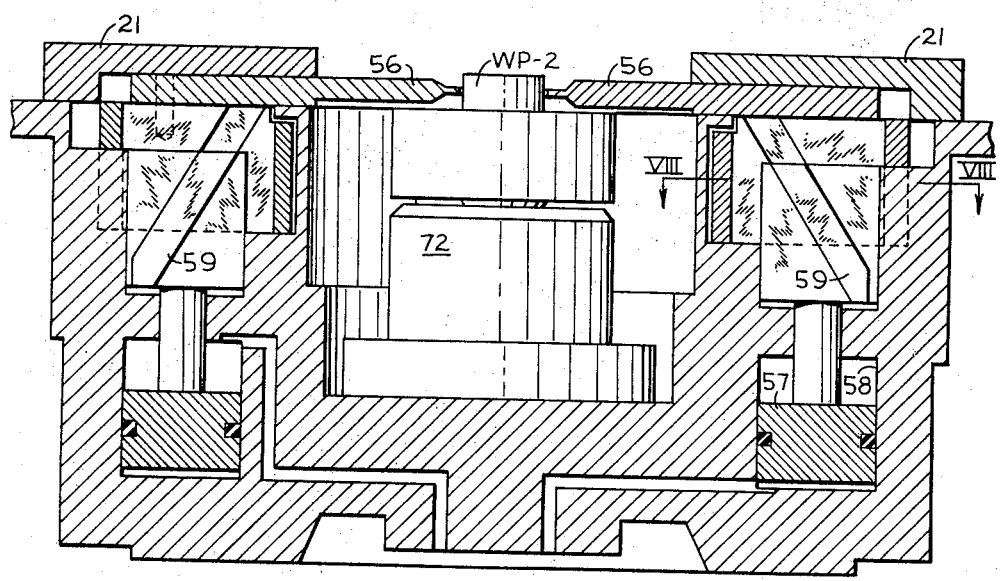
Fig-7-
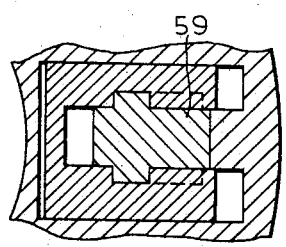
Fig-8-
INVENTORS
CHARLES E. LIPP
EUGENE R. MARTIN
IRA H. SAGE
GEORGE W. VICARY
ATTORNEYS great# United States Patent Office 3,349,982
Patented Oct. 31, 1967

3,349,982
FRICTION WELDING MACHINE WITH STORAGE MEANS FOR INERTIAL MASSES
Charles E. Lipp, Peoria, Eugene R. Martin, East Peoria, and Ira H. Sage and George W. Vicary, Peoria, Ill., assignors to Caterpillar Tractor Co., Peoria, Ill., a corporation of California
Filed Apr. 22, 1965, Ser. No. 450,075
3 Claims. (Cl. 228—2)

This invention relates to bonding machines of the kind wherein two parts to be bonded are engaged in rubbing contact at a common interface to heat the interface to a bondable condition. This invention has particular application to a bonding machine of this general type wherein the energy required to bring the interface to a bondable condition is stored as kinetic energy in rotating inertial weights. The weights are connected to one of the parts, and the entire energy necessary to form the bond is stored in weights prior to engagement of the parts at the interface. The stored energy is discharged into the interface through the frictional heating and plastic working developed at the interface as the rubbing contact slows the rotating inertial weights to a stop at the conclusion of a bonding cycle.

A bonding machine should be capable of producing bonds between parts of varied sizes, shapes and materials. Different materials and different sizes and shapes of parts require different amounts of energy. The size of the inertial weight must be matched to the size, shape and composition of the parts to be bonded. Quite large inertial weights are required for large parts. These large inertial weights are cumbersome and difficult to handle. They can also be dangerous to handle. Installation and removal of the inertial weights can also complicate the machine design. There must be adequate space for putting the flywheels on and for taking the flywheels off the machine.

It is a primary object of the present invention to store all of the inertial weights close to the rotatable spindle which carries one of the parts to be bonded. Any desired number of weights can be attached to the spindle, and the remaining weights are retained in the stored position.

It is a related object to store the weights in a way that the weights can be quickly and easily attached to or detached from the spindle.

In a preferred form of the present invention the rotatable spindle has a radially extending flange. A series of counterbored openings are formed in the flange and are shaped to hold capscrews therein. A cup-shaped container encircles the spindle and provides a storage space for a number of inertial weights. The separate inertial weights are stacked together in the container. Each of the inertial weights and one wall of the container are formed with offset portions which interlock to keep the stored inertial weights out of contact with the rotary spindle. Each of the inertial weights has screw threads tapped entirely through the weight and in alignment with the openings in the spindle flange. With this construction different length capscrews can be inserted through the openings in the flange to pick up and to attach to the spindle whatever number of inertial weights are required to bond a particular part. A bonding machine having these constructional features constitutes a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 2:
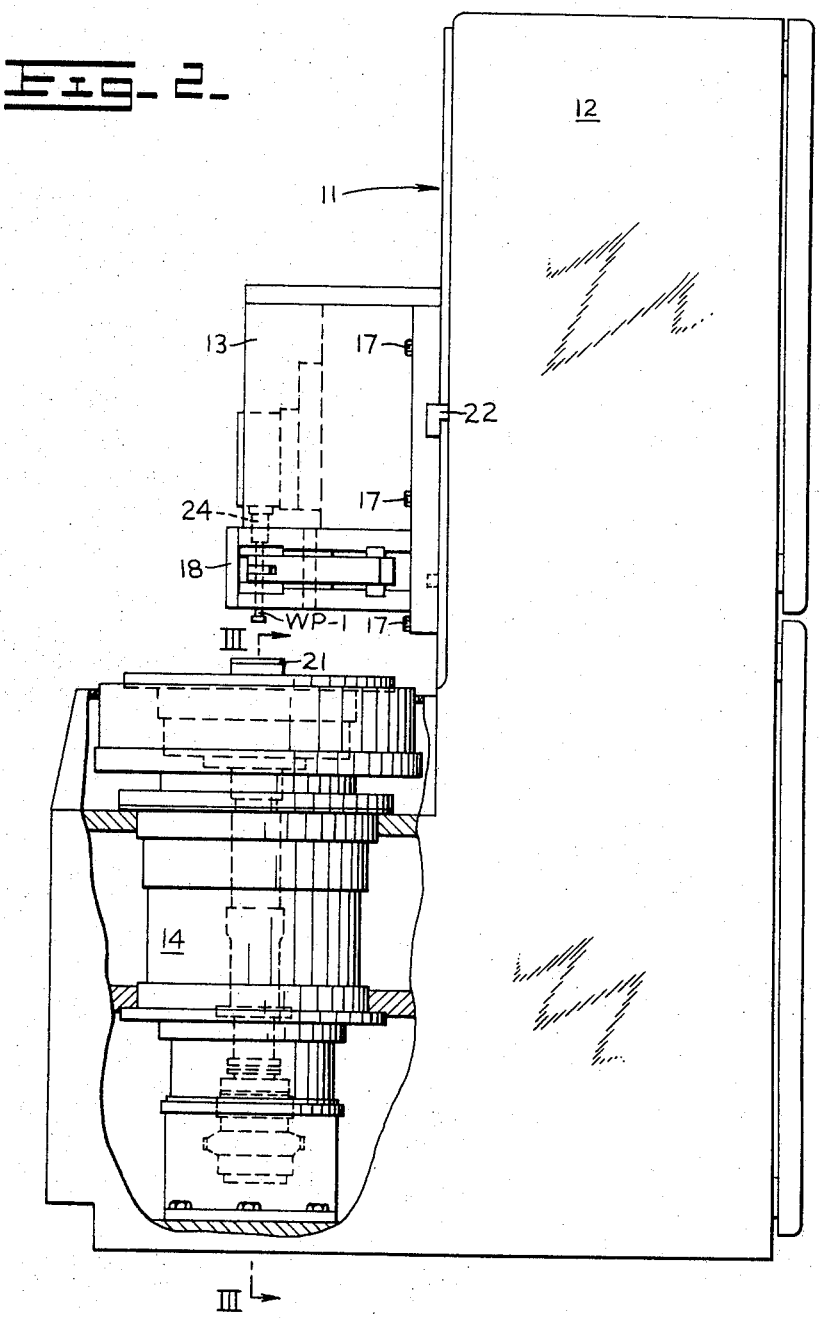

In the drawings:
FIG. 1 is a front elevation view, with some interior operating parts shown in phantom outline, of a bonding machine constructed in accordance with one embodiment of the present invention;
FIG. 2 is a side elevation view, partly broken away and with some interior parts shown in phantom outline to shown details of construction, of the machine shown in FIG. 1;
FIG. 3 is an elevational view of a cross section through the rotary spindle taken along the line and in the direction indicated by the arrows III—III in FIG. 2;
FIG. 4 is a fragmentary front elevation view, mostly broken away to show parts in section, of the upper portion of the rotary spindle and illustrates the fluid conduit structure for supplying hydraulic fluid to the hydraulically actuated chuck;
FIG. 5 is a schematic front elevation view of the fixture chuck actuating mechanism;
FIG. 6 is a fragmentary plan view taken along the line and in the direction indicated by the arrows VI—VI in FIG. 5;
FIG. 7 is a fragmentary schematic view of the chuck clamping mechanism of the rotary spindle; and
FIG. 8 is a view taken along the line and in the direction indicated by the arrows VIII—VIII in FIG. 7.

A machine constructed with one embodiment of the present invention is indicated generally by the reference numeral 11 in FIG. 1. The front and side elevation views of FIGS. 1 and 2 show the general configuration of the machine 11. The machine 11 has an L-shaped configuration in side elevation provided by L-shaped frame members 12.

A fixture mounting assembly indicated generally by the reference numeral 13 is attached to the upper part of the L-shaped frame members 12.

A combination ram and spindle assembly indicated generally by the reference numeral 14 is supported in a vertical position in the base of the L-shaped frame.

The L-shaped plates 12 are secured together by suitable gussets and spreader members 16 (see FIG. 3).

The fixture assembly 13 is detachably mounted on the upper part of the frame by cap screws 17. The fixture assembly 13 includes a pair of pressure actuated clamping mechanisms for advancing jaws 19 inwardly to clamp a non-rotating work piece WP–1 in alignment with a work piece WP–2, which is in turn secured in a rotatable and axially movable chuck 21.

The fixture assembly 13 is located by tapered keys 22 which engage slots 23 in the mounting face of the machine frame and corresponding slots formed on the back side of the fixture assembly.

An adjustable stop member 24 locates the work piece WP–1 vertically against pressure applied by upward movement of the work piece WP–1 during the bonding operation, as will be later described in greater detail.

The way in which the fixture assembly 13 is mounted on the machine frame and the fact that no vertical or rotary movement is required of the fixture assembly permits different fixture assemblies to be easily and quickly removed from and installed on the machine frame. A fixture suitable for each individual part to be welded can be installed without requiring excessive machine downtime. Only a minimum number of fluid pressure lines need to be disconnected and connected to remove one fixture assembly and to install another fixture assembly.

As best shown in FIGS. 5 and 6, the clamping jaws 19 of the fixture assembly 13 can be actuated by a single hydraulic cylinder and a simple linkage arrangement. As shown in these figures, a hydraulic cylinder 26 has a piston rod 27 pin jointed to a pair of links 28. The links 28 are in turn connected to bell cranks 29 by pins 31. Each of the bellcranks 29 are pivoted about a pivot pin 32 so that downward movement of the piston rod 27 rotates the bellcranks about the pivot pins 32 to move the clamping jaws 19, which are pinned to the bellcranks 29, into engagement with the work piece WP-1. Retraction of the rod 27 rotates the bellcranks 29 in the opposite direction to release the clamping jaws 19 from the workpiece WP-1.

The mechanism and operation of the fixture assembly can be kept quite simple because all of the rotary movement and axial movement is supplied by the combined ram and spindle assembly 14. The structure and operation of this part of the bonding machine 11 will now be described.

An electric motor 36 is connected to drive, through a suitable gear train indicated generally as 37 in FIGS. 1 and 2, a rotary spindle 41 (see FIG. 3).

With continued reference to FIG. 3, the rotary spindle 41 is carried in anti-friction bearings 42 and 43. These bearings are in turn supported in the respective lower and upper end portions of a ram piston 44. The ram piston 44 is mounted for reciprocating movement in a vertical direction in a cylinder 46. The cylinder 46 is in turn secured to the cross frame or spreader members 16.

The ram piston 44 has a piston head 47 which is of somewhat larger diameter than the rod portion of the ram piston to form pressure chambers 48 and 49 on each side of the piston head within the cylinder 46. A pair of fluid conduits 51 permit pressure fluid to be supplied to or removed from the chambers 48 and 49 by suitable valve means, which are not shown.

The rotary spindle 41 is connected to the gear train 37 by a sliding spline connection 53 in the manner shown in FIG. 3. The spline connection 53 permits a continuous drive connection from the motor 36 to the rotary spindle 41 regardless of the vertical position of the rotary spindle 41.

The chuck 21 is secured to the upper end of the spindle 41 for rotation therewith. The chuck includes clamping jaws 56 which are pressure actuated to clamp and support the work piece WP-2 in the chuck for relative rotation with respect to the stationary work piece WP-1. A piston 57 of a cylinder 58 in the rotary spindle 41 actuates the clamping jaws 56 through the linkage 59 shown in FIG. 7.

As best shown in FIG. 4, hydraulic fluid for actuating the piston 57 is supplied to the interior of the spindle 41 by conduits 61 and 62 in the ram piston 44 and conduits 63 and 64 in the rotary spindle 41. A rotary seal assembly, indicated generally by reference numeral 66, prevents loss of fluid between the rotary spindle 41 and the non-rotary ram 44. The rotary seal assembly 66 preferably includes four face-type seals.

With reference now to FIG. 3, the upper end of the rotary spindle 41 is formed with a twelve point socket 71 disposed in a locating member 72 of the chuck 21. The lower end of the work piece WP-2 is provided with a twelve point drive tang which engages the twelve point socket 71. In this manner, the work piece WP-2 is located with respect to the stationary work piece WP-1 and is positively held in the chuck 21 for rotation therewith.

The machine 11 does not transfer the energy directly from the motor 36 to the parts to be bonded, the work pieces WP-1 and WP-2. That is, the rotational rubbing contact between these pieces is not produced by direct drive from the motor 36. Instead, the energy from the motor is stored in one or more inertial weights 76 which are connected to the rotary spindle 41 for rotation with the spindle. The entire energy needed to form the bond is stored in the rotating components of the machine 11.

Different size parts require different amounts of energy. The amount of stored energy is regulated by adding inertial weights to the rotary spindle 41 or by removing inertial weights from the rotary spindle.

As noted above, the weights can be large and dangerous to handle and can complicate machine design, since some provision must be made for installing and removing the interial weights.

The present invention stores within the machine itself all the inertial weights that will ever be used to bond any part. The weights are stored at a location very close to the part of the spindle 41 to which the weights will be attached. Moreover the weights are stored in a way that any selected number weights can be attached to or detached from the spindle 41 very quickly and very easily.

As best shown in FIG. 3, a cup-shaped container 77 encircles the upper end of the rotary spindle 41. The container 77 is connected to the non-rotary ram piston 44 for axial movement with the ram piston and the rotary spindle 41. The bottom wall of the container 77 is formed with a stepped configuration 78, and each of the inertial weights 76 has a corresponding stepped configuration. This configuration permits the weights to interlock with the bottom wall and with one another to keep the stored weights out of contact with the rotary spindle 41.

The upper end of the rotary spindle 41 has a radially extending flange 79. A series of counter bored openings 81 are formed in the flange and are shaped to hold capscrews 82 therein.

Each of the inertial weights 76 has screw threads tapped entirely through the weight and in alignment with the circumferentially spaced openings 81 in the flange 79.

With this construction, different length capscrews 82 can be inserted through the openings 81 to pick up and to attach to the spindle 41 whatever number of inertial weights 76 are required to bond a particular part. This greatly simplifies the installation or removal of inertial weights when the machine 11 is changed over to bond a different kind or size of parts.

In operation, the bonding operation is started with the ram and spindle in its lowermost position. The work piece WP-1 is located in the fixture assembly 13 and the clamping mechanism 18 is energized to clamp the work piece between the jaws 19. The other work piece WP-2 is positioned in the rotatable chuck 21 and the hydraulic cylinder 58 and piston 57 are energized to move the clamping jaws 56 into engagement with the work piece WP-2. Pressurized hydraulic fluid is supplied to the chamber 49 to start the ram piston 47 upward. The motor 36 is energized to bring the spindle 41, and whatever required number of inertial weights 76 are attached to the spindle, to the desired rotational speed. The upward movement of the ram piston 41 is suitably controlled to permit the rotating spindle to come up to the desired speed before any contact is made between the work pieces WP-1 and WP-2. Once the desired speed is obtained, a spindle speed sensing mechanism deenergizes the motor 36 to allow the spindle and associated parts to float or run free. Pressurized fluid is again supplied to the chamber 49 to move the ram 44 upward and to bring the work pieces into contact under pressure. The energy stored in the rotating components is discharged into the bond zone of the work pieces WP-1 and WP-2 as the rubbing contact developed between these work pieces slows the rotating spindle to a stop at the conclusion of the bonding cycle. The work pieces WP-1 and WP-2 are then unclamped and the ram 44 is returned to its lowermost position in preparation for the next bonding cycle.

While we have illustrated and described the preferred embodiment of our invention, it is to be understood that these are capable of variation and modification, and we therefore do not wish to be limited to the precise details set forth, but desire to avail ourselves of such changes and alterations as fall within the purview of the following claims.

We claim:

1. An inertial bonding machine of the kind wherein two parts are engaged in rubbing contact at a common interface while kinetic energy stored in rotating inertial weights is discharged into the interface through frictional heating and plastic working developed at the interface as the rubbing contact slows the rotating inertial weights to a stop at the conclusion of a bonding cycle, said machine comprising, a rotary spindle for rotating one part, said spindle including a radially extending flange having a series of openings which extend therethrough and which are shaped to hold the heads of capscrews therein, capscrews extending through the opening in the flange for attaching a selected number of inertial weights to the rotary spindle depending on the length of the capscrew used, and storage means encircling the rotary spindle for storing inertial weights not needed for making a particular bond, and wherein the storage means hold a plurality of separate inertial weights in stacked-together relation therein, each of said inertial weights having screw threads tapped therein in alignment with the openings in the radially extending flange whereby different length capscrews can be inserted through the radially extending flange to pick up and to attach a selected number of inertial weights to the rotary spindle.

2. A machine as defined in claim 1 wherein the spindle extends in a vertical direction, the storage means include a non-rotary cup-shaped container, and the inertial weights and the bottom wall of the container have a stepped configuration whereby the stored weights interlock with one another and with the bottom wall of the container to keep the stored flywheels in position in the container and out of contact with the spindle.

3. A machine as defined in claim 1 including a hydraulically actuated ram operatively associated with the rotary spindle for advancing and retracting the ram and spindle axially as a unit to press the part carried by the spindle against the other part, hydraulically actuated chuck means carried by the spindle for holding one part, said chuck means including hydraulic conduits disposed internally of the spindle, and rotary fluid seal means between the spindle and the ram for preventing loss of fluid between the rotary spindle and the non-rotary ram.

References Cited
UNITED STATES PATENTS

| | | | |
|---|---|---|---|
| 3,234,645 | 2/1966 | Hollander et al. | 29—470.3 |
| 3,235,158 | 2/1966 | Hollander. | |
| 3,235,162 | 2/1966 | Hollander et al. | 29—470.3 |
| 3,273,233 | 9/1966 | Oberle et al. | 29—497.5 |

JOHN F. CAMPBELL, *Primary Examiner.*

M. L. FAIGUS, *Assistant Examiner.*